(12) United States Patent
Baba

(10) Patent No.: US 7,957,041 B2
(45) Date of Patent: Jun. 7, 2011

(54) IMAGE FORMING APPARATUS AND METHOD FOR PERFORMING JOB INTERRUPT

(75) Inventor: Masaki Baba, Kobe (JP)

(73) Assignee: Kyocera Mita Corporation, Osaka (JP)

( * ) Notice: Subject to any disclaimer, the term of this patent is extended or adjusted under 35 U.S.C. 154(b) by 1217 days.

(21) Appl. No.: 11/317,293

(22) Filed: Dec. 23, 2005

(65) Prior Publication Data

US 2006/0139704 A1 Jun. 29, 2006

(30) Foreign Application Priority Data

Dec. 24, 2004 (JP) .................. 2004-373273

(51) Int. Cl.
*H04N 1/04* (2006.01)
(52) U.S. Cl. ........ 358/498; 358/496; 358/497; 358/437; 399/81; 399/82; 399/87
(58) Field of Classification Search .................. 358/498, 358/1.15, 437, 496, 497; 355/408, 407; 399/87, 399/81, 82
See application file for complete search history.

(56) References Cited

U.S. PATENT DOCUMENTS

| | | | | |
|---|---|---|---|---|
| 4,922,296 A | * | 5/1990 | Kasuya et al. | 399/48 |
| 5,341,203 A | * | 8/1994 | Tokutsu | 399/87 |
| 5,815,770 A | * | 9/1998 | Ogino | 399/87 |
| 6,088,135 A | * | 7/2000 | Kusumoto | 358/498 |
| 2005/0047813 A1 | * | 3/2005 | Hosoi et al. | 399/87 |

FOREIGN PATENT DOCUMENTS

| | | | |
|---|---|---|---|
| JP | 5072855 | | 3/1993 |
| JP | 06205167 A | * | 7/1994 |
| JP | 8006745 | | 1/1996 |
| JP | 10224570 | | 8/1998 |
| JP | 11125995 | | 5/1999 |
| JP | 2001136339 | | 5/2001 |

\* cited by examiner

*Primary Examiner* — Chan S Park
*Assistant Examiner* — David S Cammack
(74) *Attorney, Agent, or Firm* — Ditthavong Mori & Steiner, P.C.

(57) ABSTRACT

An image forming apparatus comprises a document reading unit for reading a document on a table or at a predetermined reading position to which the document is transported by a document feeder and an interrupt key for receiving an interrupt job. When a user turns on the interrupt key, an inquiry whether a document for an interrupt job is read on a table or at a predetermined reading position to which the document is transported by the document feeder is displayed on a liquid crystal display. When the user selects either one of them, an interrupt process is executed.

3 Claims, 5 Drawing Sheets

F I G. 2
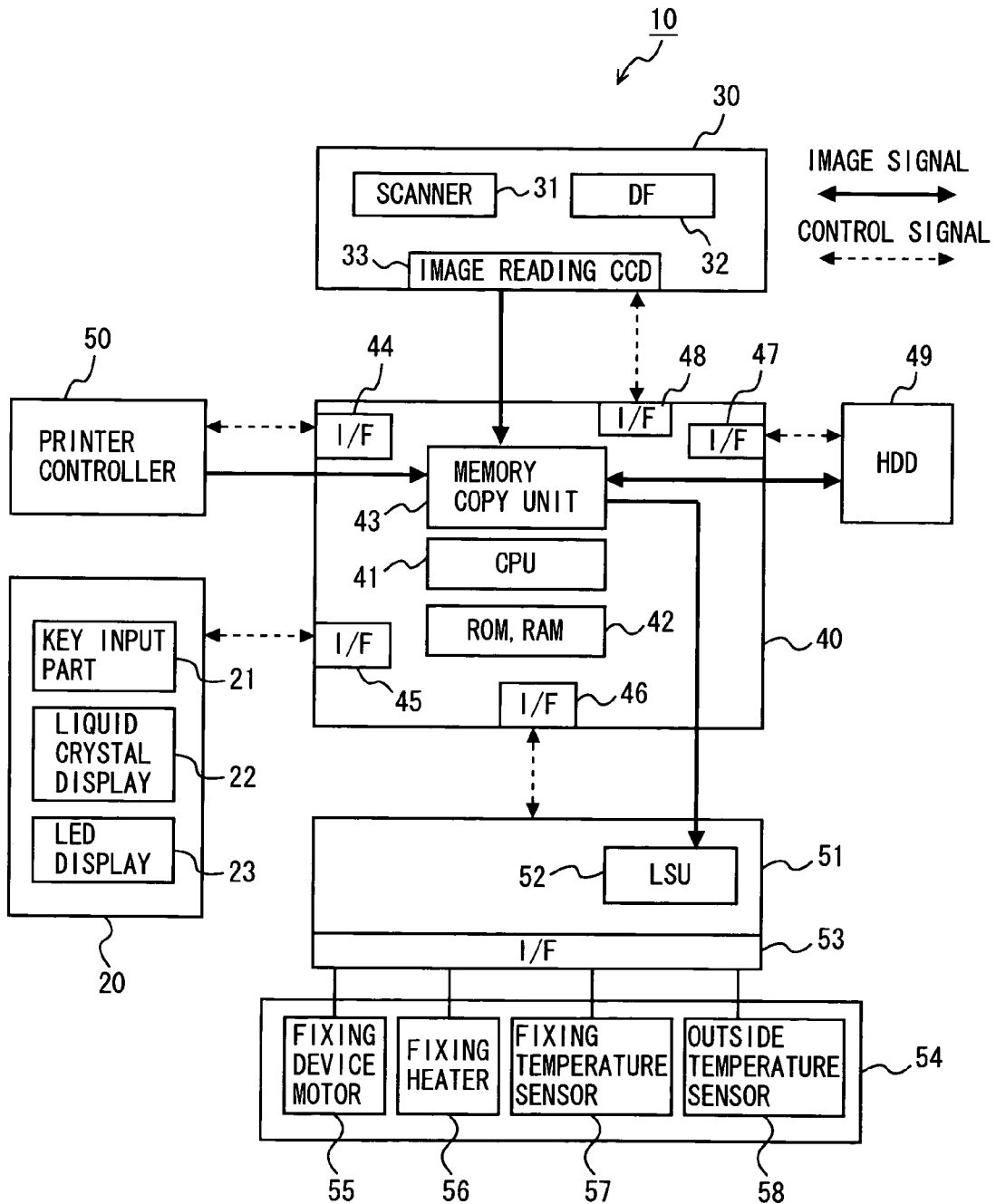

F I G. 5
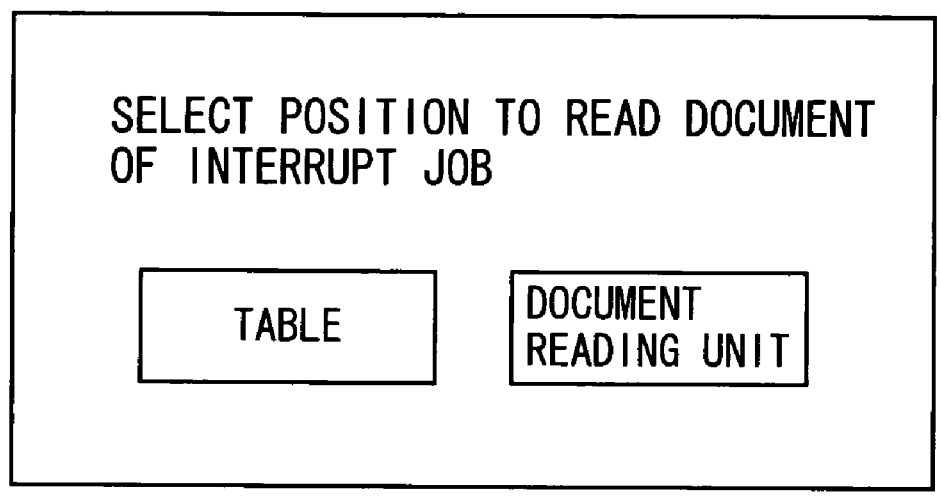

IMAGE FORMING APPARATUS AND METHOD FOR PERFORMING JOB INTERRUPT

BACKGROUND OF THE INVENTION

1. Field of the Invention

The present invention relates to an image forming apparatus and more particularly, to an image forming apparatus in which an interrupt process can be easily performed.

2. Description of the Background Art

An image forming apparatus in which a plurality of jobs can be controlled and all active jobs or any job can be temporally stopped is disclosed in Japanese Unexamined Patent Publication No. 8-6745, for example. According to this document, when the stopped reading job is restarted, the document is reset in a document feeder all over again.

Meanwhile, an image forming apparatus in which a process after paper jam is contemplated is disclosed in Japanese Unexamined Patent Publication No. 2001-136339, for example. According to this document, when a recording operation of the image forming apparatus is restarted after restoring from the paper jam, the document remaining on a document feeder is continued to be fed to a document reading unit to be read and a document image is recorded on recording paper. Thus, it is not necessary to feed the document all over again even when the paper jam is generated.

According to the conventional image forming apparatus in which any job can be temporally stopped, it is necessary to reset the document in the document feeder all over again when the stopped reading job is restarted, so that time is wasted to restart the stopped job.

Meanwhile, according to the image forming apparatus in which the process after the paper jam is considered, since the document read once is not read again (mere feeding of the document to the reading position is not performed), the document is suppressed from being damaged but an interrupt process has not been considered at all.

SUMMARY OF THE INVENTION

The present invention was made in view of the above problems and it is an object of the present invention to provide an image forming apparatus in which an appropriate interrupt process can be performed according to the number of documents and the like.

An image forming apparatus according to the present invention comprises a document reading unit reading a document on a table or at a predetermined reading position to which the document is transported by a document feeder, and interrupt job receiving unit for receiving an interrupt job, in which the interrupt job receiving unit has interrupt selecting unit for selecting a first interrupt in which the document of the interrupt job is read on the table, or a second interrupt in which the document is read at the predetermined reading position after transported by the document feeder (hereinafter this reading of the document at the predetermined reading position after transported by the document feeder is referred to as "a document is read by the document feeder"), and the image forming apparatus also comprises control unit for controlling the document feeder and the document reading unit so that when the interrupt job receiving unit receives the interrupt of the first interrupt while the document is being read by the document feeder, the reading by the document feeder is stopped and a document is read on the table to execute the first interrupt, and when the interrupt job receiving unit receives the interrupt of the second interrupt, after the document which is being read by the document reading unit is completely read out and the document set in the document feeder is all discharged, the second interrupt is executed when it is detected that a document of the second interrupt is set in the document feeder.

According to the present invention, when the interrupt job is received while the document is being read after transported by the document feeder, it can be selected whether the document of the interrupt job is read on the table or by the document feeder.

Since a user can select the feeder or the table as a reading position of the document, the image forming apparatus can perform the most appropriate interrupt process depending on the number of documents and the like.

In addition, when the interrupt process is performed by reading on the table, since the active job is stopped and the interrupt process can be executed immediately, the image forming apparatus can perform the interrupt process without affecting the active job.

Preferably, the interrupt selecting unit comprises a selection key to select only the first interrupt.

More preferably, when the interrupt selecting unit receives the interrupt job of the first interrupt, the control unit invalidates paper jam detection of the document feeder.

BRIEF DESCRIPTION OF THE DRAWINGS

FIG. 2 is a functional block diagram of the image forming apparatus;

FIG. 5 is a view showing a display screen of a liquid crystal display when a user turns on an interrupt key.

DESCRIPTION OF THE PREFERRED EMBODIMENTS

Figure 1A:
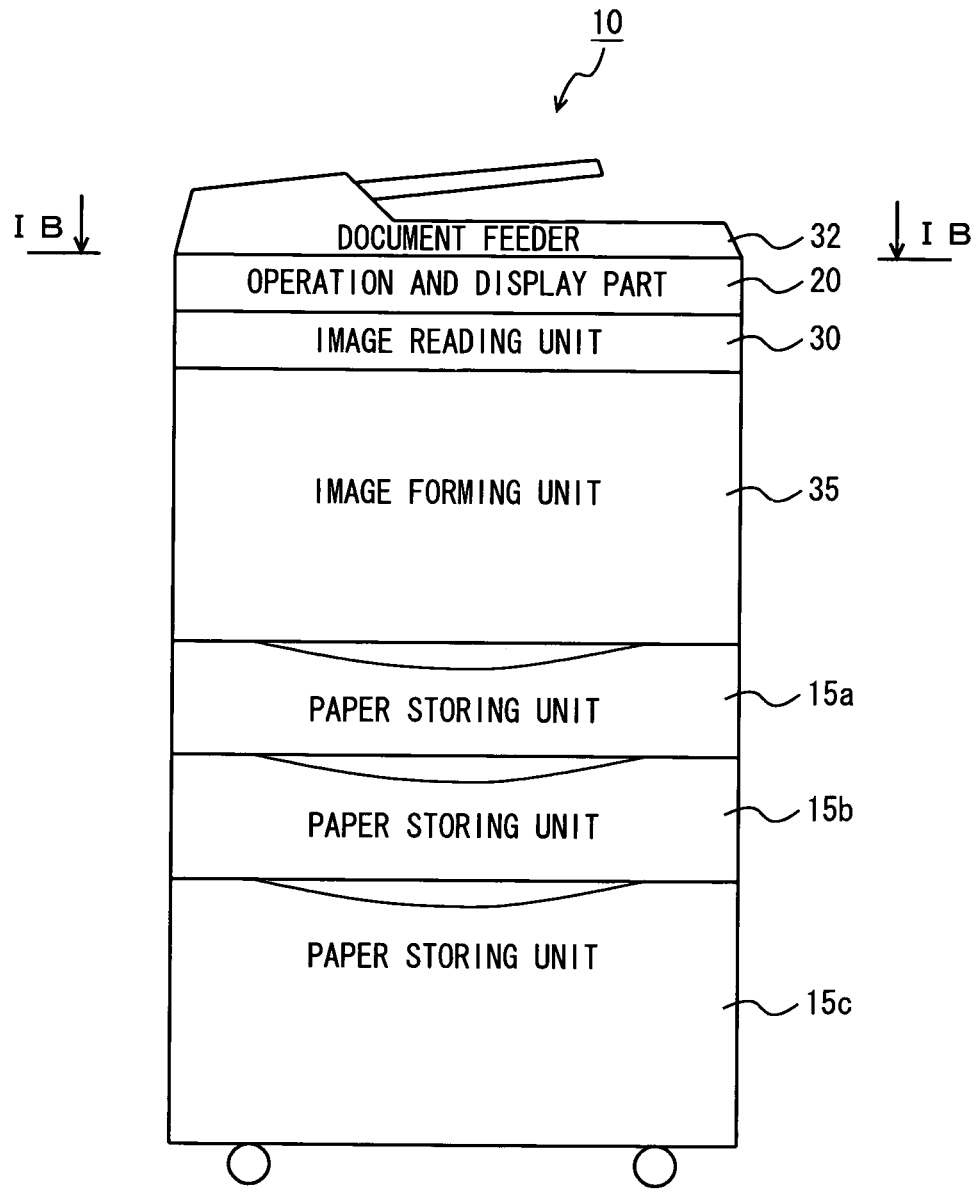
FIG. 1A is a schematic view showing an entire constitution of an image forming apparatus.
Figure 1B:
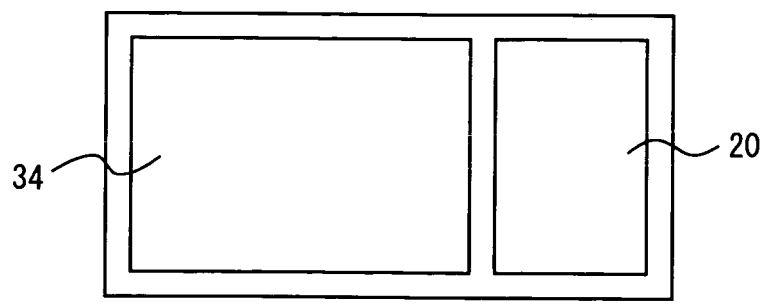
FIG. 1B is a view taken along the arrows IB-IB in FIG. 1A.

An embodiment of the present invention will be described with reference to the drawings hereinafter. FIG. 1A is a schematic view showing a constitution of an image forming apparatus 10 when an embodiment of the present invention is applied to an image forming apparatus having a copying function. FIG. 1B is a plan view taken along arrows IB-IB in FIG. 1A. Referring to FIG. 1A, the image forming apparatus 10 comprises a document feeder 32 which automatically feeds a document to a predetermined document reading position, an operation and display part 20 serving as an interface between the image forming apparatus 10 and a user, an image reading unit 30 which reads and scans an image of the document transported by the document feeder 32 at the predetermined reading position, an image forming unit 35 which is provided under the image reading unit 30 and forms the image of the document read by the image reading unit 30, and a plurality of paper storing units 15a to 15c which are provided under the image forming unit 35 and store sheets to be used for copying and the like.

The document feeder 32 can be closed or opened against the operation and display part 20, and FIG. 1B shows a plan view when the document feeder 32 is open. Referring to FIG. 1B, when the document feeder 32 is opened, there are provided a table 34 on which the document is set with its reading surface down and the operation and display part 20.

The document set on the table 34 is read by a scanner 31 having an image reading CCD 33 (refer to FIG. 2).

FIG. 2 is a functional block diagram of the image forming apparatus 10 shown in FIG. 1. In FIG. 2, the same reference numerals are allotted to the same parts as in FIG. 1.

Referring to FIG. 2, the image reading unit 30 of the image forming apparatus 10 comprises the scanner 31 scanning the document and the image reading CCD 33 provided in the scanner 31. The image reading unit 30 also comprises the document feeder (DF) 32 which automatically feeds the document to the predetermined reading position.

A control unit 40 controls the image reading unit 30 and the operation and display part 20 and the like, and serves as an interrupt receiving unit and an interrupt selecting unit. The control unit 40 comprises a CPU 41 controlling the entire image forming apparatus 10, a ROM and RAM 42 in which various kinds of data is stored, a memory copy unit 43 receiving data from the image reading CCD 33 and supplying the data to a hard disk 49 or a printer engine 51, and interfaces (I/F) 44 to 48 with various kinds of external devices.

A printer controller 50, the above described operation and display part 20, the printer engine 51, the hard disk 49 serving as an image storing unit, and the image reading CCD 33 are connected to the interfaces (I/F) 44 to 48, respectively.

The operation and display part 20 comprises a key input part 21 such as a numeric key pad, a liquid crystal display 22 and an LED display 23. The user makes a desired setting such as copying in the key input part 21. Meanwhile, the CPU 41 gives notice of a state of the image forming apparatus 10 such as paper jam on the liquid crystal display 22 and the LED display 23. The user may make setting for the image forming apparatus on the liquid crystal display 22 as a touch panel.

The key input part 21 comprises a start button which starts a reading operation of the document set in the document feeder 32 or the document set on the table 34 by the scanner 31, a termination button which terminates a reading operation, and the like.

The printer engine 51 comprises an LSU (Laser Scanner Unit) 52, and an interface 53 with a fixing unit 54, and the fixing unit 54 comprises a fixing drive motor 55, a fixing heater 56, a fixing temperature sensor 57 and an outside temperature sensor 58.

The document is read out by the image reading unit 30 based on the user setting inputted from the operation and display part 20. The image data of the document is stored in the RAM 42 or the hard disk 49, and its latent image is formed on a photoreceptor drum (not shown) incorporated in the printer engine 51, transferred to a sheet fed from the sheet storing units 15*a* to 15*c* by the fixing unit 54, and discharged to a sheet discharging unit (not shown).

A thick line designates a flow of an image signal and a dotted line designates a flow of a control signal in the drawing.

Figure 3:
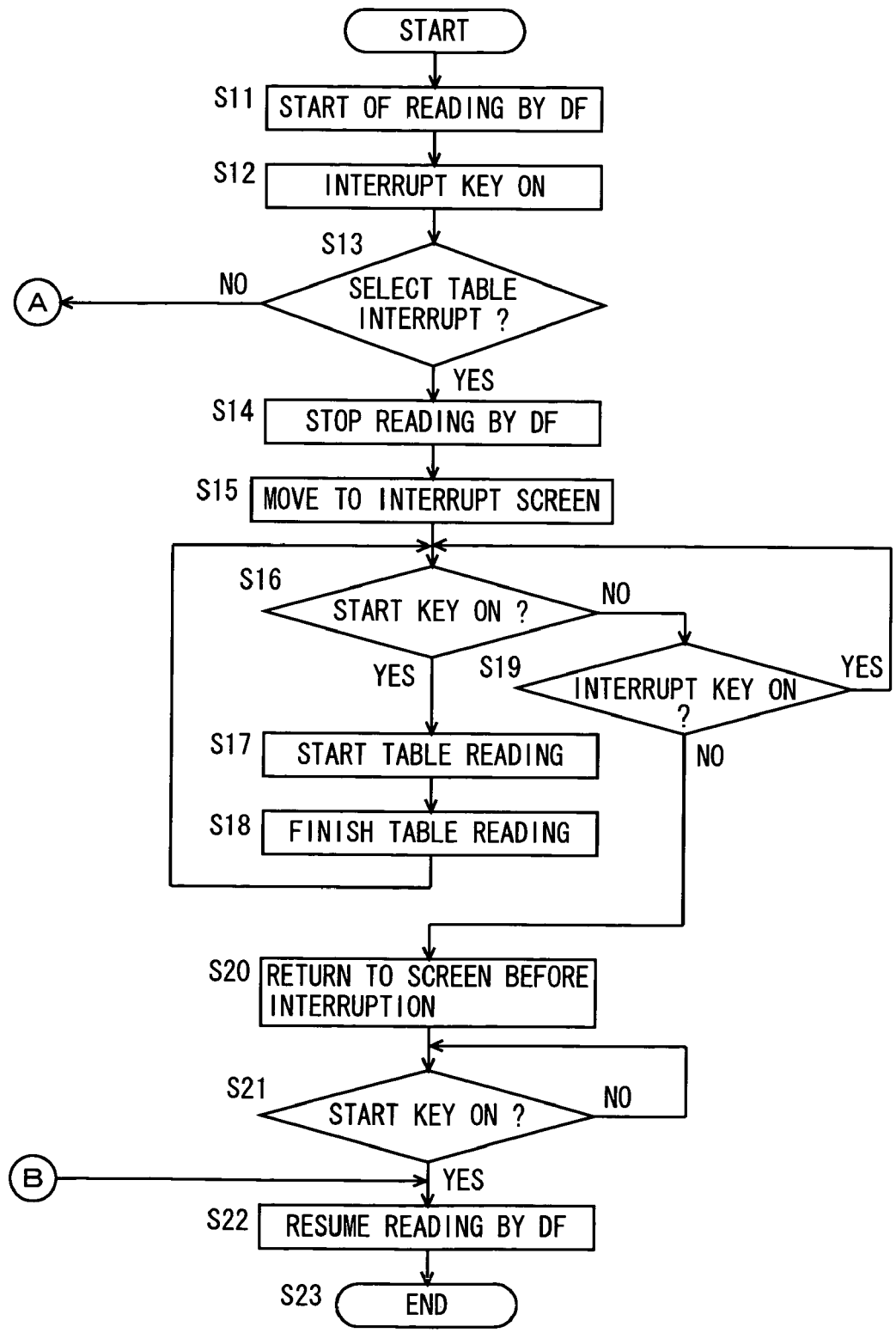
FIG. 3 is a flowchart showing an operation of the image forming apparatus.
Figure 4:
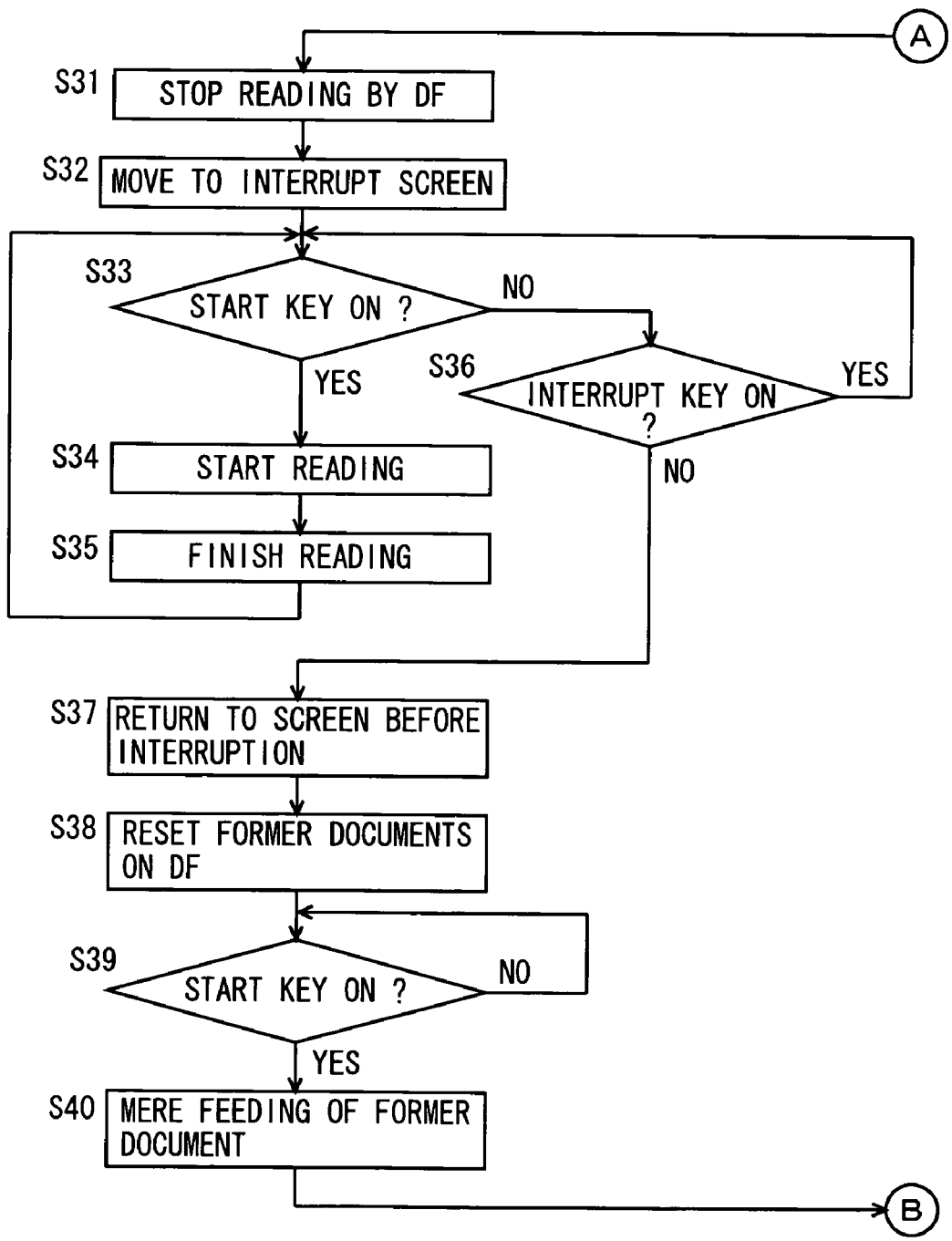
FIG. 4 is a flowchart showing the operation of the image forming apparatus.

Next, an operation of the image forming apparatus 10 will be described. FIGS. 3 and 4 are flowcharts showing an operation of the CPU 41 when a job is interrupted while the document is being read out by the document feeder of the image forming apparatus 10.

Referring to FIGS. 3 and 4, the user sets the document in the document feeder 32 of the image reading unit 30 and instructs the start of reading the document from the operation and display part 20 at step S11 (the term "step" is omitted hereinafter). While the document is being read, another user turns on an interrupt key of the liquid crystal display 22 of the operation and display part 20 to interrupt a job at S12.

When the user turns the interrupt key on, an inquiry whether a document reading of the interrupt job is performed on the "table" (first interrupt) or it is performed by the "document reading unit" (second interrupt) is shown on the liquid crystal display as shown in FIG. 5. Then, the user selects either one of them.

When the user selects the "table" (table interrupt is selected at S13), after a document which is being transported is completely read out, the document is discharged by the document feeder 32, and the document feeder 32 stands by at the next document reading standby position and detection of paper jam by the document feeder 32 is invalidated at S14. Then, an interrupt screen is displayed on the liquid crystal display 22 at S15.

The reason why the detection of the paper jam by the document feeder 32 is invalidated is to avoid the situation as follows. More specifically, if the detection of the paper jam by the document feeder 32 is in effect, a paper jam detecting operation is automatically performed when the interrupt user opens the document feeder 32 to set the document of the interrupt job on the table 34.

When the user sets the document on the table and turns on the start key on the interrupt screen (YES at S16), the scanner 31 starts to read the document on the table 34 at S17. When the document is completely read out at S18, the operation returns to S16 to read the next document. When the user sets the next document and turns the start key on, the above operation is performed again.

After the reading of the document is completed, when the user does not turn the start key on, the operation proceeds to S19, and it is determined whether the interrupt key is turned on again or not. When the interrupt key is turned on again (YES, at S19), the operation returns to S16 and when the interrupt key is not turned on, the display of the liquid crystal display 22 is returned to the screen before the interrupt process at S20.

When the start key is turned on, (YES at S21), the reading of the document by the document feeder 32 is restarted at S22 and when the reading is completed, the process is completed at S23.

Thus, when another job is interrupted while the document reading unit 30 is reading the document, the user can select whether the interrupt is performed on the table 34 or by the document feeder 32. Thus, when the document of the interrupt job is read from the table 34, the reading of the document for the job which is being read is temporally stopped and document for the interrupt job can be immediately read from the table 34. As a result, the interrupt process can be performed without affecting the active job with an easy operation.

In addition, although the document reading position of the interrupt job can be selected in the above embodiment, the present invention is not limited to this and an interrupt key only for table reading may be displayed. In this case, since the interrupt user selects the interrupt of the table reading, the normal process and the interrupt process can be performed in short time.

When the user of the interrupt job does not select the table interrupt, that is, when the document of the interrupt job is read by the document feeder 32 (the table interrupt is not selected at S13), the operation proceeds to S31 and the reading process by the document feeder 32 is stopped. That is, when the reading of the document which is being read is completed, the document in the document feeder is all discharged and the reading operation is finished. Then, the liquid crystal display 22 displays the interrupt screen at S32. Then, on the interrupt screen, it is determined whether the start key is turned on or not at S33, and when it is determined that it is turned on (YES at S33), the reading is started and finished at S34 and S35, and the operation is returned to S33 to determined whether the start key to read the next document is turned or not.

When the start key is not turned on (NO at S33), it is determined whether there is another interrupt with the interrupt key or not at S36. When the interrupt key is turned on (YES at S36), the operation is returned to S33 and the above process is repeated (S33-S35). Meanwhile, when the interrupt key is not turned on (NO at S36), the operation proceeds to S37 and the display of the liquid crystal display 22 is returned to the screen before the interrupt. Then, the document before the interrupt process is reset in the document feeder 32 at S38.

Then, when the start key is turned on (YES at S39), mere feeding of the document to the reading position is performed at S40 until the document whose reading is interrupted and the document is read by the document feeder 32 again at S22.

Thus, when the interrupt is performed, since the document feeder or the table can be selected, appropriate interrupt process can be performed according to the number of the documents and the like.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. An image forming apparatus comprising:
   a document reading unit reading a document on a table or at a predetermined reading position to which the document is transported by a document feeder;
   an interrupt job receiving unit for receiving an interrupt job;
   said interrupt job receiving unit having an interrupt selecting unit for selecting between a first interrupt in which a document of the interrupt job is read on said table without being transported by said document feeder, and a second interrupt in which a document of the interrupt job is transported by said document feeder and read on said table;
   said interrupt selecting unit displaying an inquiry with respect to reading of a document of the interrupt job either on the table to execute the first interrupt or through the document reading unit to execute the second interrupt, after receiving the interrupt job by the interrupt job receiving unit; and
   a control unit for controlling said document feeder and said document reading unit so that when said interrupt job receiving unit receives an interrupt job of said first interrupt while a document is being transported by said document feeder, the transporting by said document feeder is stopped and, upon operator input, a document of the interrupt job is scanned on said table to execute said first interrupt, and when the interrupt job receiving unit receives an interrupt job of said second interrupt while a document is being transported by said document feeder, after the document which is being read by said document reading unit is completely read out and discharged by said document feeder, said second interrupt is executed to perform the scanning of the interrupt job when it is detected that a document of the interrupt job of said second interrupt is set in said document feeder.

2. The image forming apparatus according to claim 1, wherein said interrupt selecting unit comprises a selection key to select only said first interrupt.

3. The image forming apparatus according to claim 1, wherein when said interrupt selecting unit receives said interrupt job of said first interrupt, said control unit invalidates paper jam detection function of the document feeder.

* * * * *